Figure 1:
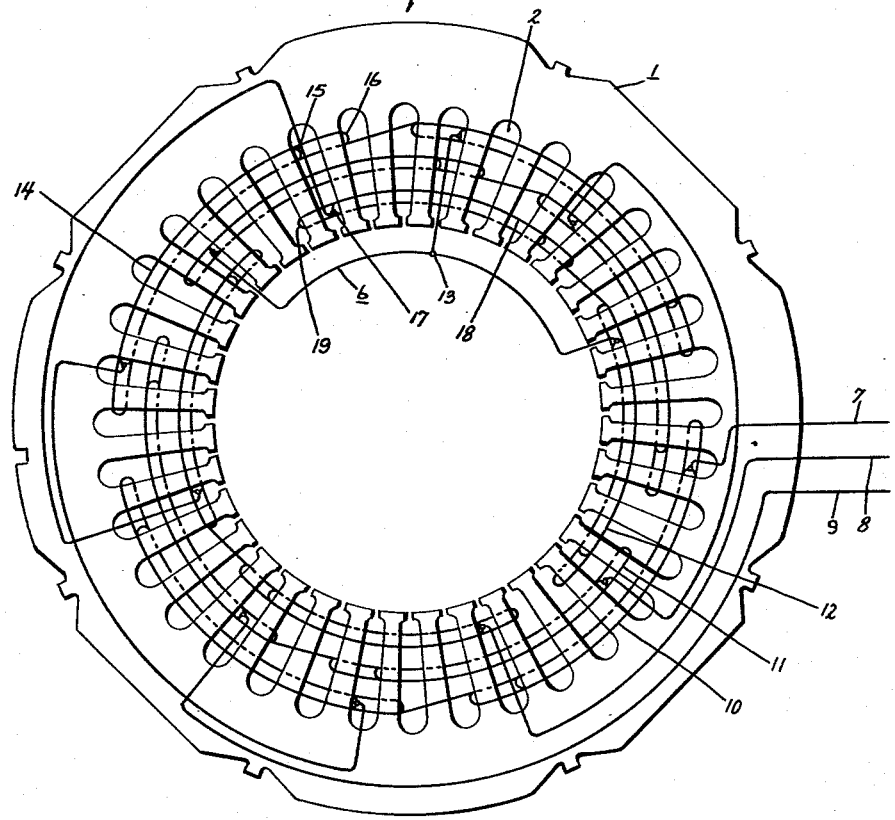

June 18, 1957

G. B. DUNN, JR 2,796,543

POLYPHASE INDUCTION-TYPE MOTORS

Filed July 13, 1956

Inventor:
George B. Dunn, Jr,
by
His Attorney.

United States Patent Office 2,796,543
Patented June 18, 1957

2,796,543

POLYPHASE INDUCTION-TYPE MOTORS

George B. Dunn, Jr., Fort Wayne, Ind., assignor to General Electric Company, a corporation of New York Application July 13, 1956, Serial No. 597,639

2 Claims. (Cl. 310—202)

This invention relates to dynamoelectric machines, and more particularly to electric motors of the induction type intended to be operated from a polyphase source of alternating-current power.

Induction-type electric motors normally include relatively rotatable primary and secondary core members, with the primary core member having a winding arranged on it connected to be energized from a suitable source of alternating-current power. The forming of a suitable winding on the primary core member to provide the desired operating characteristics represents one of the more expensive items in the manufacture of the motor. This is particularly true in the case of polyphase motors where, in order to obtain suitable operating characteristics, it has long been found necessary in most cases to use a lap-type winding. This must normally be inserted in the slots by hand and precludes the economy represented by machine winding and inserting of the coils in the slots. More recently, some motors have incorporated an arrangement whereby each phase pole is formed of a plurality of concentric coils thus permitting use of the coil inserting machines; the number of such coils is made equal to the number of slots as in the case of the lap winding so that each slot receives one side of each of two coils. This generally necessitates phase insulation between the coils in each slot. The combination of the continued need for phase insulation and the fact that the number of coils equals the number of slots has precluded substantial economy being obtained from the concentric arrangement. In order to effect such economy, some motors have been manufactured having but a single coil for each phase pole and others have been provided with only half as many coils as slots. While such arrangements obviously provide for an increase in economy, the operating characteristics of motors so formed frequently leave much to be desired. More specifically, such arrangements usually cause excessive spatial harmonics in the magnetomotive force which have a most undesirable effect on the motor operating characteristics.

It is most desirable to obtain the economy which is possible through coil insertion machines and by reducing the number of coils in a given motor core, and to effect this goal while avoiding the serious harmonic problems brought about by the use of single-coil and half coil per slot arrangements. However, much of the benefit of the reduction in number of coils may be lost unless there is full utilization of all slots despite the decrease in the number of coils to a number less than that of the slots; this occurs because of the adverse effect on motor performance of incomplete slot utilization. The number of coils, therefore, must remain high enough to provide acceptable operating standards, and must permit full slot utilization.

It is, accordingly, an object of this invention to provide an improved polyphase induction motor having an improved winding arrangement which will be economical while retaining desirable operating characteristics.

A more specific object of the invention is to provide a winding arrangement which will permit the use of concentric coils in a number which is less than that of the number of slots but which nonetheless provides desirable motor operating characteristics.

Yet another object of the invention is to achieve the concentric-coils relation referred to above while retaining full utilization of all slots.

In one aspect, this invention provides a polyphase induction motor having $\phi$ phases and $p$ poles. The motor is provided with a primary core member having N slots formed therein, and windings are positioned on the core so as to form a plurality of concentric distributed coils for each phase pole. "Distributed" is used in the sense generally applied by those working in the art to which the present invention relates, i. e., that the distribution of turns between concentric coils is unequal. Thus, at least one coil of each phase-pole has a number of turns substantially different from another coil concentric therewith. The windings form a total of $$\frac{K}{N/p\phi} \times N \text{ coils}$$

where K and $N/p\phi$ are both integers and $$\frac{K}{N/p\phi}$$

is a fraction greater than one-half and smaller than unity. The coils are distributed so as to effect equal slot fullness in all slots, this relationship being made possible by the above-stated relationship of the number of coils to the number of slots, poles, and phases.

The features of the invention which are believed to be novel are set forth with particularity in the appended claims. The invention itself, however, both as to its organization and method of operation, together with further objects and advantages thereof, may best be understood by reference to the following description taken in connection with the accompanying drawing.

Figure 2:
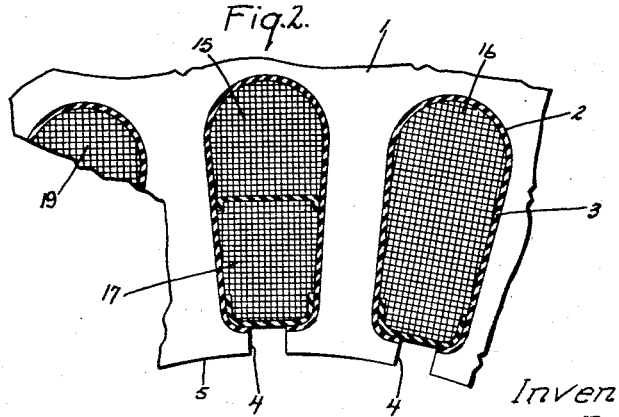

In the drawing,

Figure 1 is a schematic view of a polyphase induction motor primary member (or stator) having the improved winding arrangement of the invention; and Figure 2 is a fragmentary view, partly in cross section, showing the distributed coil arrangement within the slots of the primary member.

As has been stated, one of the objectives of this invention is to reduce the number of coils below the one coil per slot ratio to effect the economies which have been discussed; thus, it is obviously imperative that the number of coils per slot be less than one in order for the purpose of the invention to be achieved. However, on the other hand, there is the limitation that when only one coil for every two slots is provided, the harmonic content of the magneto-motive force becomes undesirably large and the motor performance is adversely affected. As a result, it is necessary for the purpose of the invention to be achieved that the coils per slot be a fraction larger than one-half but smaller than unity. A prime requirement of this fraction is that it permit complete slot utilization, in the sense discussed above. I have found that in a motor having N slots, $p$ poles and $\phi$ phases, complete slot utilization is possible where the vulgar fraction representing coils per slot has the integer $$\frac{N}{p\phi}$$

as the denominator. The fraction may thus be represented as $$\frac{K}{N/p\phi}$$

with K being an integer sufficiently great to make the fraction greater than one-half and small enough so that it is not as large as unity. When the coils to slots ratio is determined in this manner, it then becomes possible for a motor to be designed so that there is full slot utilization and, performance-wise, it is comparable to the expensive one coil per slot lap winding, and frequently superior to an ordinary concentrically wound one coil per slot motor with the coils all having equal turns.

To provide a specific example of the invention, there is provided in the figures of the drawing an induction motor primary member, or stator, 1 having a total of 36 slots 2. As may be seen in the enlarged view of Figure 2, each slot 2 is provided in the usual manner with a slot liner 3 for insulation purposes, and is formed with an opening 4 to the bore 5 of stator member 1. Stator 1 has a winding 6 adapted to be connected across a source of three-phase alternating-current power through conductors 7, 8 and 9. While a Y connected winding has been shown, with all three phase windings 10, 11 and 12 being connected together at point 13, it will be understood that other types of connections, such as delta connections, well known to those in the art, may be utilized for the three phase arrangement shown. It will further be understood that the invention in its broader aspect is not necessarily limited to a three phase arrangement although, in view of the commonness of this type of source of power, such an application is of primary importance.

It will further be observed from Figure 1 that each of the phase windings 10, 11, and 12 are arranged to provide four equal poles. With this in mind, it then becomes possible to find the denominator of the determining fraction by inserting suitable figures in the expression $$\frac{N}{p\phi}$$

This gives $$\frac{36}{4 \times 3}$$

or a denominator of 3. In the light of the foregoing requirements, then, the proportion of coils to slots will be $$\frac{K}{3}$$

with the expression being greater than a half and yet less than unity. Since K must be an integer larger than 1.5 and yet smaller than 3.0, it becomes completely clear that $K=2$ and that the proportion of coils to slots must be two-thirds to provide the desired performance characteristics and effect complete slot utilization.

Applying the critical fraction, the number of coils proper in the instant case is 36 times two-thirds, or 24. Equal division of this number of coils between the three phases provides eight coils per phase and, since there are four poles to be formed in each phase, there will be two concentric coils provided for each phase-pole. This may be seen, for instance, by reference to phase-pole 14 which includes the two concentric coils 15 and 16.

The number of slots available for the coils of a single phase-pole is $$\frac{N}{p\phi}$$

which has already been determined to be three. It is readily apparent that the number of slots for one set of coil sides of a phase-pole is half of that, or 1.5 slots. Since all slots are to be equally filled, it will be readily understood that, in the illustrated case of the two coils per phase-pole arrangement, each slot which is not entirely filled by a single coil side will be only half filled so that it can receive the smaller coil side of another phase-pole. Thus, one coil of each phase-pole will have a number of turns such that its two coil sides will fill two half-slots and the coil sides of the other coil concentric therewith will fill up two entire slots. To be more specific, the coils numbered 15 and 16 appear in Figure 2 as shown, and coil side 17 of phase-pole 18 fills up the other half of the slot which was half filled by coil side 15. Referring again specifically to Figure 1, it will be seen that each inner concentric coil side of a phase-pole lies in the same slot as the inner concentric coil side of another phase-pole, while each outer coil side of each phase-pole fills a slot by itself. Thus, two-thirds of the slots have a single coil provided in them, while the remaining one-third have two coils positioned in them in the manner of coils 15 and 17 in Figure 2.

In this manner, complete slot utilization is achieved for all thirty-six slots in a motor that has a harmonic content so low that its performance is comparable to the lap wound motor having a one coil per slot arrangement. The coils of each phase-pole are concentric so that machine insertion of them becomes a relatively simple matter; in fact, it has been found that even where hand insertion methods are used, the concentric coil arrangement described hereabove is economically more advantageous than a lap winding arrangement. Also, there are only two-thirds as many coils which provides further economy. Yet another desirable feature lies in the fact that only one-third of the thirty-six slots require any phase insulation whatsoever.

It will be understood that the particular motor of the drawing is illustrated only for purposes of explaining the invention and that the invention is not limited to such a motor. To the contrary, the restriction is only to polyphase induction-type motors wherein all the slots have equal slot fullness, an equal number of concentric distributed coils per phase-pole is provided, and the total number of coils is determined in accordance with the aforementioned expression $$\frac{K}{N/p\phi}$$

To give just one example of the many possibilities, if a three phase two pole machine had thirty slots, and the advantages of the invention were desired, use of the expression $$\frac{N}{p\phi}$$

would give a total of five slots per phase-pole. The expression $$\frac{K}{5}$$

then shows that the desirable effect of the invention can be obtained either by making K equal to 3 or 4 so that the number of coils which will provide the desired effect in slot fullness and performance (with a reasonable winding design in accordance with the knowledge of those skilled in the art) is either eighteen or twenty-four. If the eighteen coil design is selected, it will then be apparent that a total of three coils per phase-pole is provided, with four coils per phase coil being provided in the twenty-four coil arrangement. Where, as is the case in both these alternatives, more than two coils per phase-pole are provided, distribution of the coils (that is, the unequal arrangement of them) may be carried far beyond that of the illustrated example in a manner of which will be well understood by those familiar with the art.

It will thus be seen from the foregoing that the invention is susceptible of utilization in polyphase induction motors where there are varying numbers of poles, slots, and phases, provided the requirements of the invention as set forth above are met.

What I claim as new and desire to secure by Letters Patent of the United States is:

1. A polyphase induction motor having $\phi$ phases and $p$ poles including a primary core member having $N$ slots, and windings positioned on said core forming like groups of concentric distributed coils for said phase-poles respectively, said windings forming a total of $$\frac{K}{N/p\phi} \times N \text{ coils}$$

where K and $$\frac{N}{p\phi}$$

are integers, and $$\frac{K}{N/p\phi}$$

fraction greater than one half and smaller than unity, said coils being distributed to effect equal slot fullness in all slots.

2. A three phase induction motor having four poles including a primary core member having thirty-six slots, and windings positioned on said core and forming like pairs of concentric distributed coils for said phase-poles respectively, the outer coil of each phase-pole entirely filling each slot in which it is positioned and the inner coil side of each phase-pole filling half of each slot in which it is positioned, an outer coil side being positioned in each of two-thirds of said slots and two inner coil sides being positioned in each of the other one-third of said slots to effect equal slot fullness in all said slots.

No references cited.